(12) United States Patent
Hurst et al.

(10) Patent No.: US 7,805,920 B2
(45) Date of Patent: Oct. 5, 2010

(54) LAWN MOWER HAVING STEEPLY INCLINED EXIT TUNNEL AND BATTERY ACCESS THROUGH REAR FACE OF MOWER CUTTING DECK

(75) Inventors: John O. Hurst, Lakeville, MN (US); Chris A. Wadzinski, Inver Grove Heights, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/270,557

(22) Filed: Nov. 13, 2008

(65) Prior Publication Data

US 2010/0115901 A1 May 13, 2010

(51) Int. Cl.
*A01D 67/00* (2006.01)
(52) U.S. Cl. ...................................... 56/320.2
(58) Field of Classification Search ............ 56/202, 56/320.2, 16.6, 13.3, 5, 194, DIG. 20, DIG. 9
See application file for complete search history.

(56) References Cited

U.S. PATENT DOCUMENTS

| | | | | |
|---|---|---|---|---|
| 4,149,362 A * | 4/1979 | Haffner et al. | ................. | 56/202 |
| 4,505,095 A * | 3/1985 | Short, Sr. | ...................... | 56/202 |
| 4,800,712 A * | 1/1989 | Morse et al. | .................. | 56/202 |
| 4,848,070 A * | 7/1989 | Berglund | ...................... | 56/202 |
| 5,442,902 A * | 8/1995 | Mosley et al. | ................. | 56/17.5 |
| 6,490,851 B2 * | 12/2002 | Kutsukake | .................. | 56/320.1 |
| 6,705,068 B2 * | 3/2004 | Iida et al. | ....................... | 56/202 |
| 6,862,875 B2 * | 3/2005 | Iida et al. | .................... | 56/320.2 |
| 7,194,850 B2 * | 3/2007 | Asahara et al. | ................. | 56/202 |
| 2002/0023421 A1 * | 2/2002 | Kutsukake | .................. | 56/320.2 |
| 2005/0076629 A1 * | 4/2005 | Iida et al. | .................... | 56/320.2 |
| 2005/0109003 A1 * | 5/2005 | Shibata et al. | ................. | 56/202 |
| 2005/0284121 A1 * | 12/2005 | Iida et al. | ....................... | 56/202 |
| 2006/0042215 A1 * | 3/2006 | Plouraboue et al. | ........... | 56/202 |
| 2006/0185341 A1 * | 8/2006 | Grimwade | ...................... | 56/202 |
| 2007/0056259 A1 * | 3/2007 | Uemura et al. | ................. | 56/202 |
| 2009/0260339 A1 * | 10/2009 | Uemura et al. | ................. | 56/202 |

* cited by examiner

*Primary Examiner*—Árpád Fábián-Kovács
(74) *Attorney, Agent, or Firm*—James W. Miller

(57) ABSTRACT

A walk behind lawn mower has an exit tunnel that is opened and closed by a pivotal mulch door to convert the mower between collecting and mulching modes of operation. An operating handle fixed to the mulch door includes a vertically reciprocal push button for releasing locking tabs that engage detents for holding the mulch door in the open and closed positions thereof. The bottom wall of the exit tunnel has a steeply inclined rear ramp section that is angled upwardly relative to the horizontal at least approximately 45°. The rear discharge opening of the exit tunnel occupies approximately an upper quarter of the area of the rear face of the cutting deck. Grass clippings flow into the upper portion of a grass collector through this high, steeply angled exit tunnel to promote even and full filling of the grass collector in the collecting mode.

11 Claims, 16 Drawing Sheets

LAWN MOWER HAVING STEEPLY INCLINED EXIT TUNNEL AND BATTERY ACCESS THROUGH REAR FACE OF MOWER CUTTING DECK

TECHNICAL FIELD

This invention relates generally to walk behind rotary lawn mowers that are selectively convertible by the user between collecting and mulching modes of operation.

BACKGROUND OF THE INVENTION

Walk behind lawn mowers are well known for mowing grass. Such mowers comprise a movable cutting deck having a cutting chamber that carries a substantially horizontal rotary cutting blade. A handle extends upwardly and rearwardly from deck the deck. An operator grips the handle and walks behind the mower to guide and control the mower.

The cutting chamber is formed on the underside of deck 4 and includes a top wall and a downwardly extending, peripheral side wall. The cutting chamber has an open bottom facing the ground so that the blade rotating inside the cutting chamber can contact and sever grass as the cutting chamber moves over the ground. The cutting chamber is often shaped as an annular channel extending around most of the periphery of the cutting chamber adjacent the sidewall of the cutting chamber. The grass clippings created by the blade will circulate through at least a portion of this annular channel before leaving the cutting chamber through an exit tunnel.

The exit tunnel receives the grass clippings from the cutting chamber and conducts the grass clippings to a rear discharge opening on the exit tunnel. The grass clippings are often collected in a grass collector when such a collector is connected to the discharge opening. This is the collecting mode of operation of the lawn mower. Alternatively, the rear discharge opening of the exit tunnel can be selectively closed by a pivotal mulch door to retain the grass clippings within the cutting chamber for downward discharge into the cut grass path. This is the mulching mode of operation of the lawn mower. U.S. Pat. No. 7,367,174, assigned to the assignee of this invention, discloses a lawn mower that is selectively convertible by the user between collecting and mulching modes of operation through the use of a pivotal mulch door in the exit tunnel.

While mowers having pivotal mulch doors are known, the mulch doors are often operated by linkages that are fairly complicated and obtrusive. Many of these linkages are often contained on the exterior of the mower and include numerous parts. This leads to extra expense in manufacturing the mower and decreases the aesthetics of the mower. There is a need in the art for a mulch door that can be operated by a simple and durable mechanism that is largely hidden within the mower. The operating mechanism should be conveniently located and easy to operate by the user. The operating mechanism desirably should also securely lock or retain the mulch door in the open or closed positions thereof.

In addition, the performance of the mower in both its collecting and mulching modes should be optimized to the maximum extent possible despite the presence of the mulch door. Often, mowers that are convertible between collecting and mulching modes might work well in one mode but not the other, i.e. they might be a good mulching mower but a poor grass collecting mower or vise versa. Accordingly, there is also a need for a mower of this type which has excellent performance in both modes of operation.

SUMMARY OF THE INVENTION

One aspect of this invention relates to a lawn mower having at least a collecting mode of operation. The mower comprises a cutting deck having a downwardly facing cutting chamber. A handle assembly extends upwardly and rearwardly from the cutting deck to allow a user who walks behind the cutting deck to guide and operate the cutting deck. A rotatable cutting blade within the cutting chamber cuts grass by rotating about a substantially vertical axis of rotation within a substantially horizontal cutting plane. An exit tunnel located on the deck extends rearwardly from a front inlet opening to a rear discharge opening located on a rear face of the deck. A grass collector for receiving and retaining grass clippings has an open mouth substantially overlying the rear face of the deck and completely overlying the rear discharge opening of the exit tunnel. The grass collector extends rearwardly from the cutting deck. The exit tunnel has a bottom wall that includes a rear ramp section having a rear edge that forms a lower edge of the rear discharge opening. The rear ramp section is inclined approximately at least 45° upwardly relative to the horizontal for projecting the grass clippings upwardly into an upper portion of the grass collector.

One aspect of this invention relates to a lawn mower having at least a collecting mode of operation. The mower comprises a cutting deck having a downwardly facing cutting chamber. A handle assembly extends upwardly and rearwardly from the cutting deck to allow a user who walks behind the cutting deck to guide and operate the cutting deck. A rotatable cutting blade within the cutting chamber cuts grass by rotating about a substantially vertical axis of rotation within a substantially horizontal cutting plane. An exit tunnel located on the deck extends rearwardly from a front inlet opening to a rear discharge opening located on a rear face of the deck, wherein the rear face has an upper left quarter, an upper right quarter, a lower left quarter and a lower right quarter from a perspective of an observer standing behind the rear face and looking forwardly. A grass collector receives and retains grass clippings therein. The grass collector has an open mouth that substantially covers all four quarters of the rear face and extends rearwardly from the cutting deck. The rear discharge opening of the exit tunnel has an open area that covers approximately one of the upper quarters of the rear face.

Yet another aspect of this invention relates to a lawn mower convertible between mulching and collecting modes of operation. The mower comprises a cutting deck which is supported by rotatable ground engaging members for movement over the ground. A downwardly facing cutting chamber defined by the deck has a top wall, a peripheral substantially circular sidewall extending vertically downwardly from the top wall, and an open bottom circumscribed by the sidewall. A rotatable cutting blade within the cutting chamber for cutting grass by rotating about a substantially vertical axis of rotation within a substantially horizontal cutting plane. An exit tunnel located on the deck extends rearwardly from a front inlet opening to a rear discharge opening. The front inlet opening is positioned in the circular sidewall of the cutting chamber at one side of a rear of the cutting chamber and the rear discharge opening is positioned behind the front inlet opening and the cutting chamber. A pivotal mulch door within the exit tunnel is selectively pivotal by a user between an open position and a closed position relative to the exit tunnel about a substantially horizontal axis located adjacent an upper edge of the front inlet opening of the exit tunnel. The mulch door in the open position permits grass clippings to pass through the exit tunnel and into a grass collector associated with the rear discharge opening of the exit tunnel in the collecting mode of operation. The mulch door in the closed position prevents grass clippings from passing through the exit tunnel such that the grass clippings must eventually leave the cutting chamber through the open bottom of the cutting chamber in the mulching mode of operation. An operating handle is fixedly connected to the mulch door for pivoting the mulch door between its open and closed positions. The handle extends from the mulch door through an elongated fore and aft extending slot leading into an interior portion of the deck with the slot having front and rear ends. The mulch door is in the open position thereof when the handle is positioned at one end of the slot and the mulch door is in the closed position thereof when the handle is positioned at the other end of the slot.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
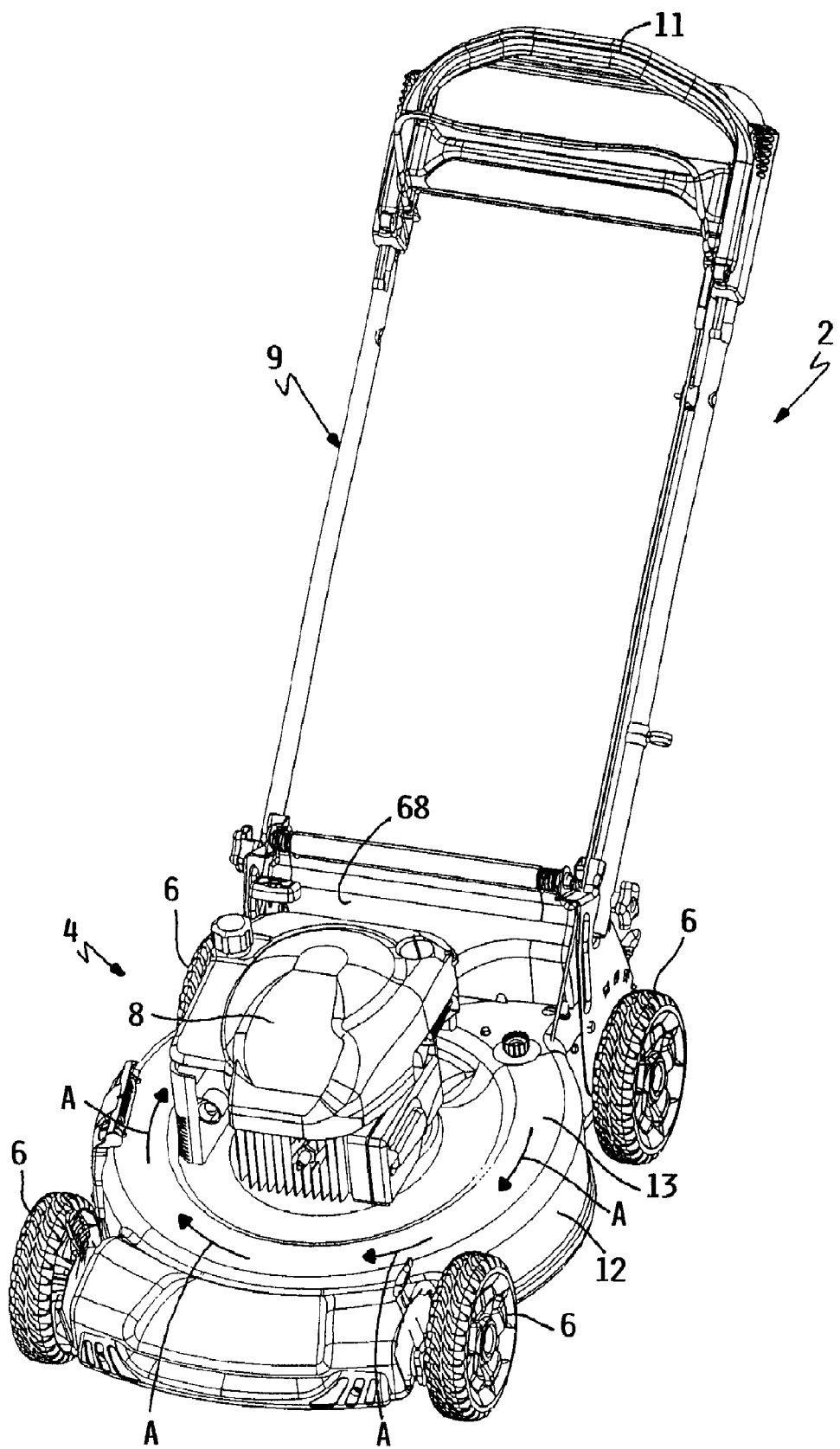
FIG. 1 is a perspective view of a lawn mower according to this invention, particularly illustrating the mower without a grass collector.

A walk behind lawn mower according to this invention is generally illustrated as 2 in FIG. 1. Mower 2 includes a cutting deck 4 supported for rolling over the ground by four wheels 6 at the corners of deck 4. Short ground engaging rollers could be substituted for each wheel 6 or long rollers spanning the width of deck 4 could be substituted for each pair of wheels 6 or both pairs of wheels 6 if so desired. The center of deck 4 has a slight depression or indentation in which an internal combustion engine 8 is mounted. Other power sources, such as an electric motor, fuel cell, hybrid gas-electric power system, etc., could be used in place of engine 8. Engine 8 has a vertical drive spindle (not shown) that extends down through the top wall of deck 4.

An upwardly and rearwardly extending handle assembly 9 allows an operator to walk behind mower 2 to guide and operate mower 2. In a self-propelled version of mower, handle assembly 9 can include a slidable handle grip 11 for controlling the ground speed of mower 2. Slidable handle grip 11 is disclosed in more detail in U.S. Pat. No. 6,082,083, which is hereby incorporated by reference.

A rotary cutting blade 10 is mounted on the vertical spindle of engine 8 beneath the top wall of deck 4 to rotate in a substantially horizontal cutting plane. Deck 4 includes an annular cutting chamber extending around deck 4 with the cutting chamber being bounded by an outer, circumferential peripheral sidewall 12 extending downwardly from a top wall 13 of the cutting chamber. As cutting blade 10 is rotated in its horizontal cutting place, sharpened cutting edges at the tips of cutting blade 10 sever the grass and create grass clippings. The tips of cutting blade 10 have trailing upturned sails that create a circumferential airflow. Thus, the grass clippings are circulated within the annular cutting chamber in the direction of the arrows A in FIG. 1 which corresponds to the direction in which the blade is rotated.

Figure 2:
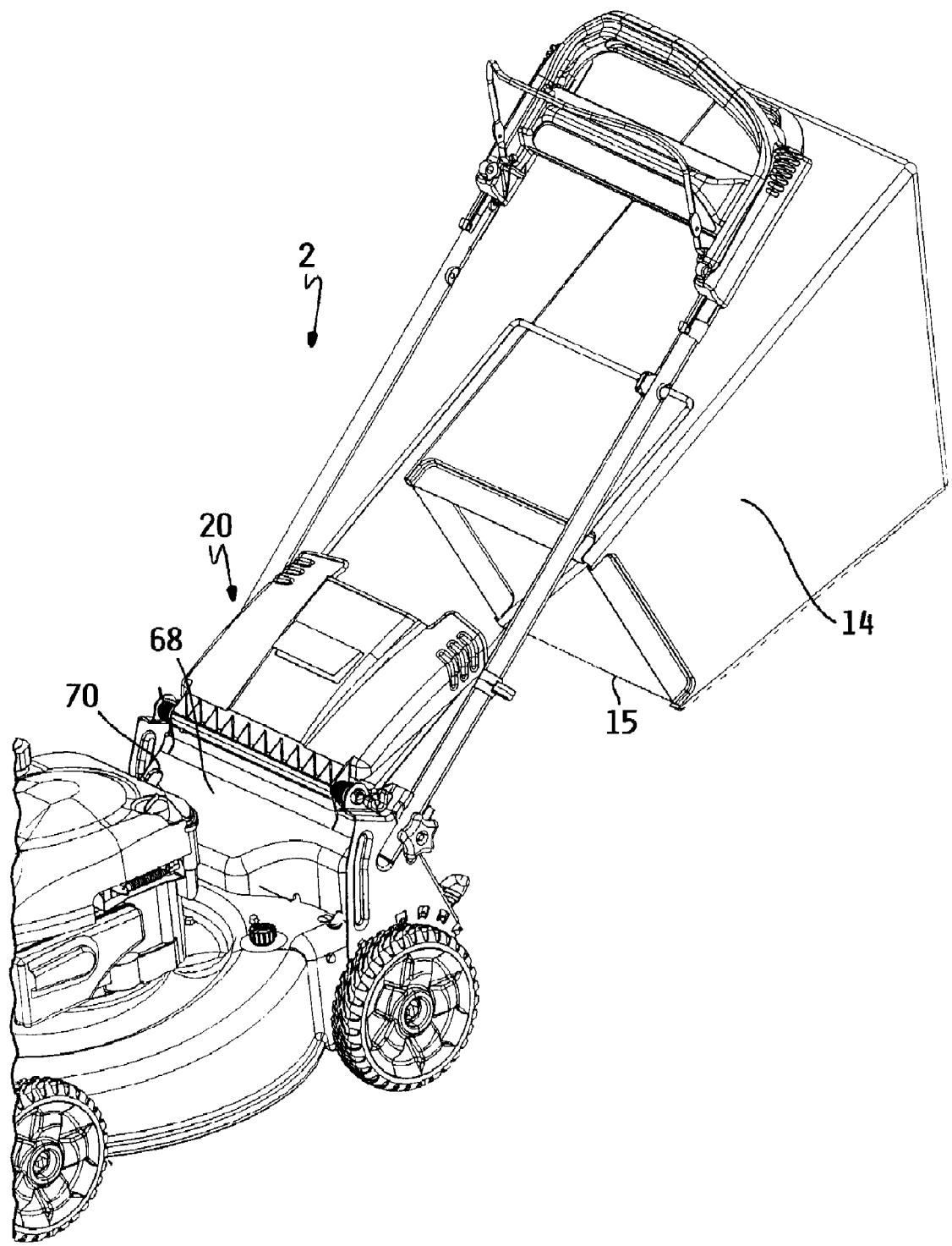
FIG. 2 is a perspective view of the mower of FIG. 1, particularly illustrating the mower with a grass collector separated from the rear of the mower.
Figure 3:
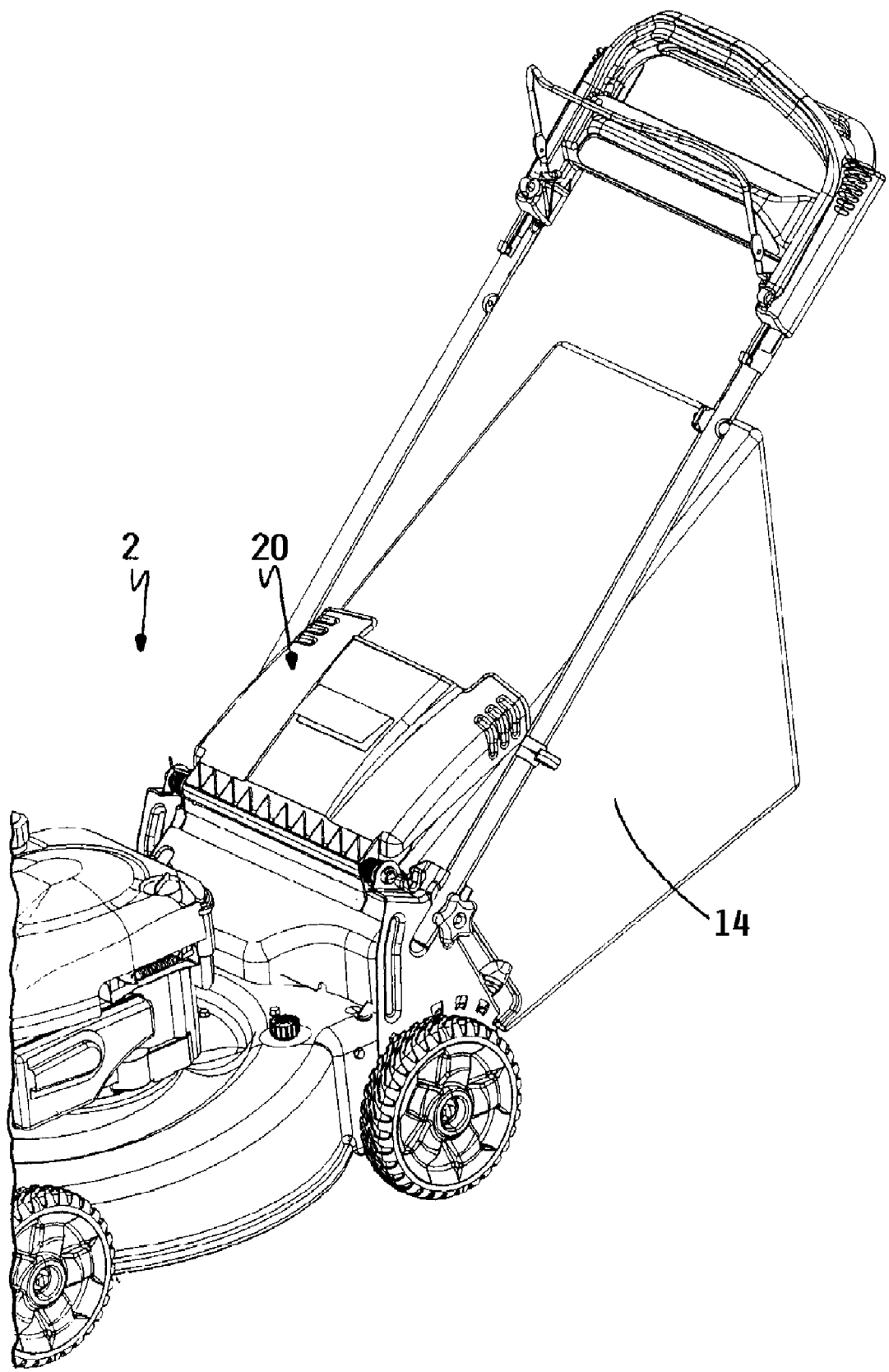
FIG. 3 is a perspective view similar to FIG. 2, particularly illustrating the mower with a grass collector attached to the rear of the mower.
Figure 13:
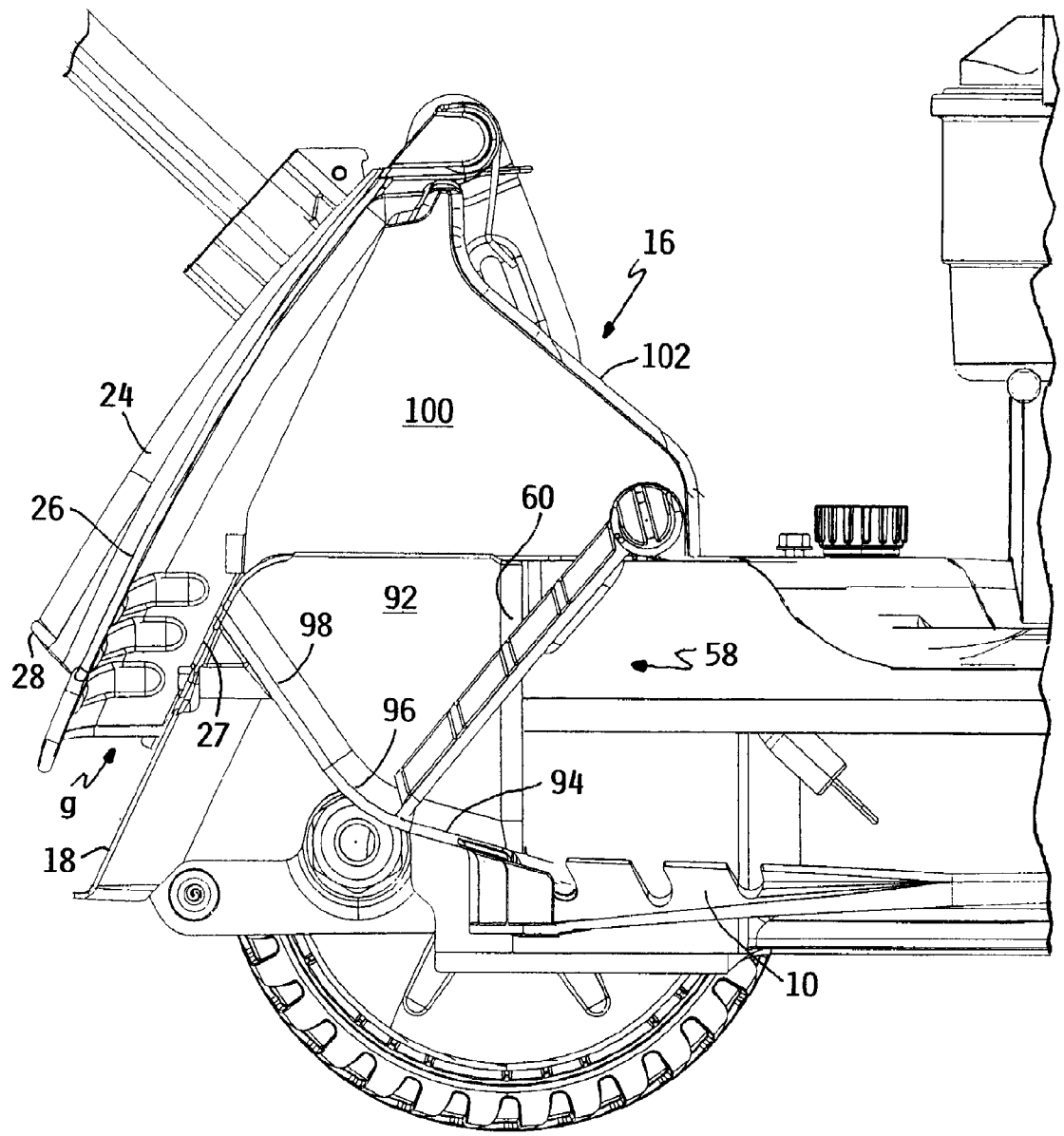
FIG. 13 is a partial, longitudinal cross-sectional view of the rear of the mower of FIG. 1 taken through the exit tunnel, particularly illustrating the mulch door in a closed position in the exit tunnel to place the mower into its mulching mode of operation.

How the grass clippings exit from the cutting chamber depends upon whether mower 2 is in a collecting or a mulching mode of operation. In the collecting mode as shown in FIG. 3, a grass collector 14 having an open mouth 15 is attached to the rear of mower 2. The open mouth 15 of grass collector 14 can be seen in FIG. 2. In addition as shown in FIG. 13, an exit tunnel 16 on top of deck 4 at the right rear end of mower 2 is open to provide a passageway through the rear of mower 2. Thus, the grass clippings after being cut flow in the direction of the arrows A and then exit directly through exit tunnel 16 during their first pass through the cutting chamber to be deposited within and collected by grass collector 14.

In the mulching mode, grass collector 14 may be present as shown in FIG. 3 or may be removed as shown in FIG. 1. Regardless of whether or not grass collector 14 is present, exit tunnel 16 is selectively closed by the user of mower 2. Now, the grass clippings cannot leave the cutting chamber through exit tunnel 16 but are circulated around the cutting chamber in the direction of the arrows A. This recirculation might last for a number of passes around the cutting chamber until the grass clippings are cut and recut and eventually fall downwardly into the cut grass path through the open bottom face of the cutting chamber. In the mulching mode, these grass clippings, which have been driven downwardly into and largely hidden by the remaining standing grass in the cut grass path, will decompose and serve as nutrients to the turf.

Figure 4:
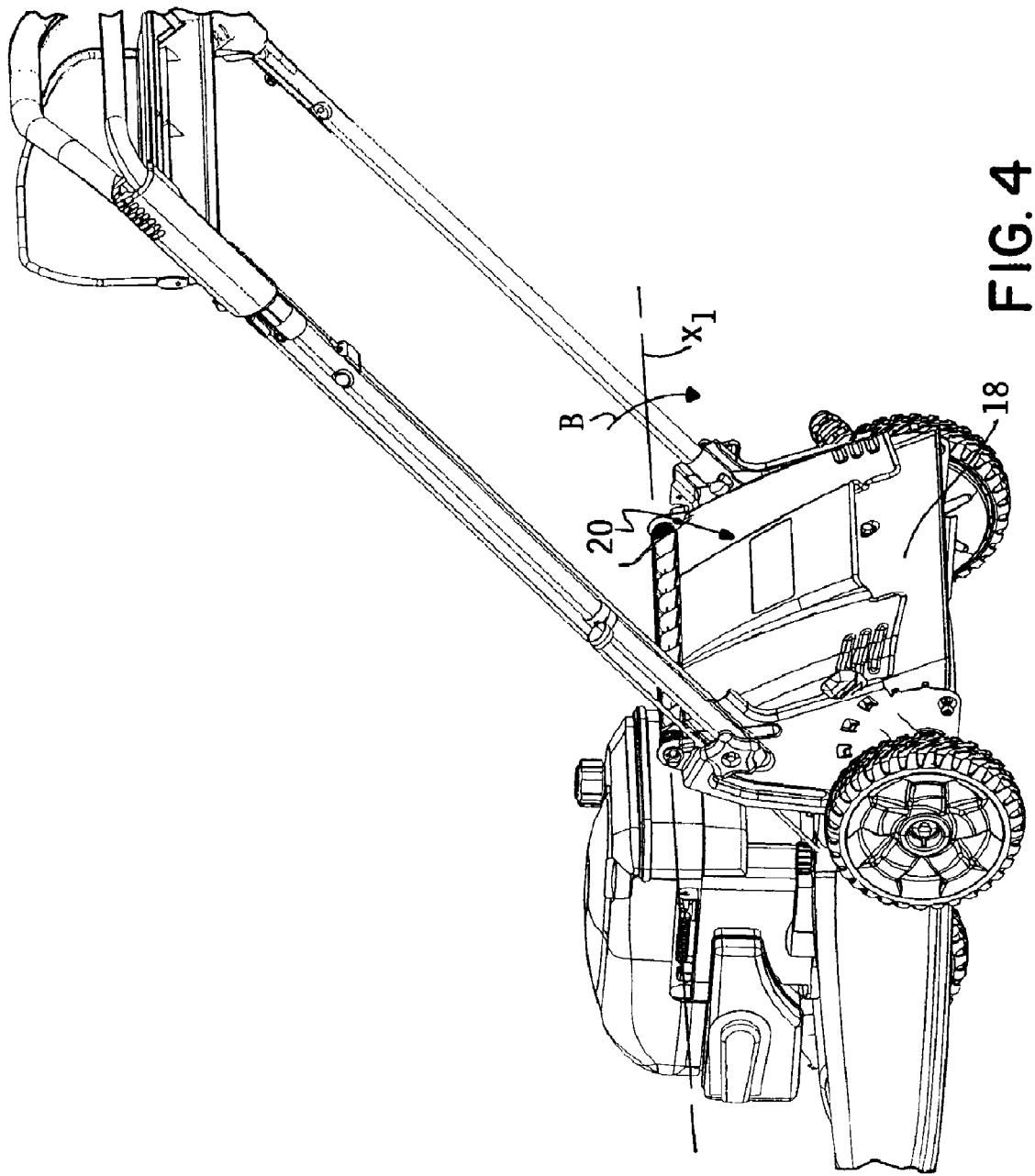
FIG. 4 is a perspective view of the mower of FIG. 1, particularly showing a rear cover in a lowered position covering the rear discharge opening of the exit tunnel.
Figure 5:
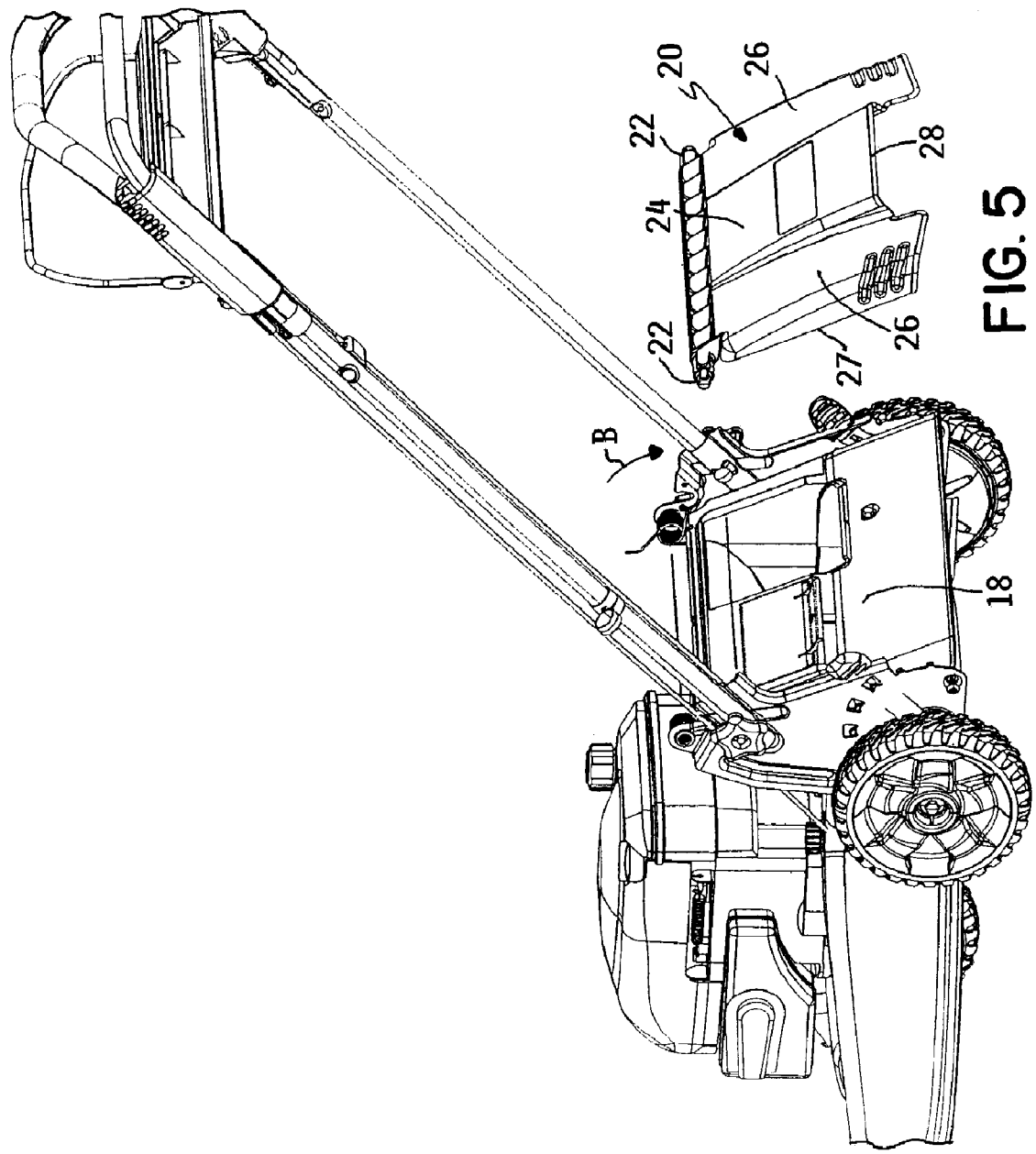
FIG. 5 is a perspective view similar to FIG. 4, but showing the rear cover having been separated from the rear of the mower.

Referring now to FIGS. 4-7, the rear of mower 2 has a generally planar rear face 18 that is inclined slightly forwardly as it rises. A pivotal rear cover 20 has a pair of trunnions 22 extending to either side thereof as best shown in FIG. 5. Trunnions 22 pivotally mount cover 20 in short, circular hubs 21 or openings on support flanges 23 along the upper edge of rear face 18 of mower 2. See FIG. 9. This avoids the expense of an elongated, transverse pivot rod for journaling cover 20 since trunnions 22 can be molded as part of cover 20. Preferably, cover 20 is a one piece molded plastic part having a raised center channel 24 and a side flap 26 on either side of channel 24. The lower edge 28 of channel 24 forms a hand grip for allowing a user to manually raise cover 20.

Cover 20 rotates about a substantially horizontal pivot axis x1 from a lowered position in which side flaps 26 of cover 20 abut against rear face 18 of mower 2, as shown in FIG. 4, to a raised position in which cover 20 overlies and rests atop the front of grass collector 14, as shown in FIG. 3. Two torsion springs 30, best shown in FIG. 6, act between cover 20 and some other portion of mower 2 to bias cover 20 in the direction of the arrow B in FIGS. 4 and 5. Thus, cover 20 is normally disposed in its lowered position with side flaps 26 abutting against rear face 18 of mower 2 along their lower edges 27. Cover 20 stands off or is spaced away from rear face 18 of mower 2 as illustrated by the gap g in FIG. 13. The user can insert his or her hand into the gap g and grip lower edge 28 of channel 24 to manually raise cover 20 against the bias of torsion springs 30. This is done when attaching grass collector 14 to mower 2 or to otherwise gain access to rear face 18 of mower 2.

One reason for gaining access to rear face 18 of mower 2 is to remove or install a battery 32 that is carried on mower 2. Battery 32 could have different purposes on mower 2. In a simple system, battery 32 is simply a source of electrical power used for starting engine 8 when engine 8 is equipped with an electric starter. In a more complex system, battery 32 could also comprise a source of electrical power for powering an electric motor(s) used either for rotating cutting blade 10 or for wheel drive propulsion or both. In this latter use, battery 32 could be part of a battery only drive system or be part of an engine/battery hybrid drive system.

Figure 6:
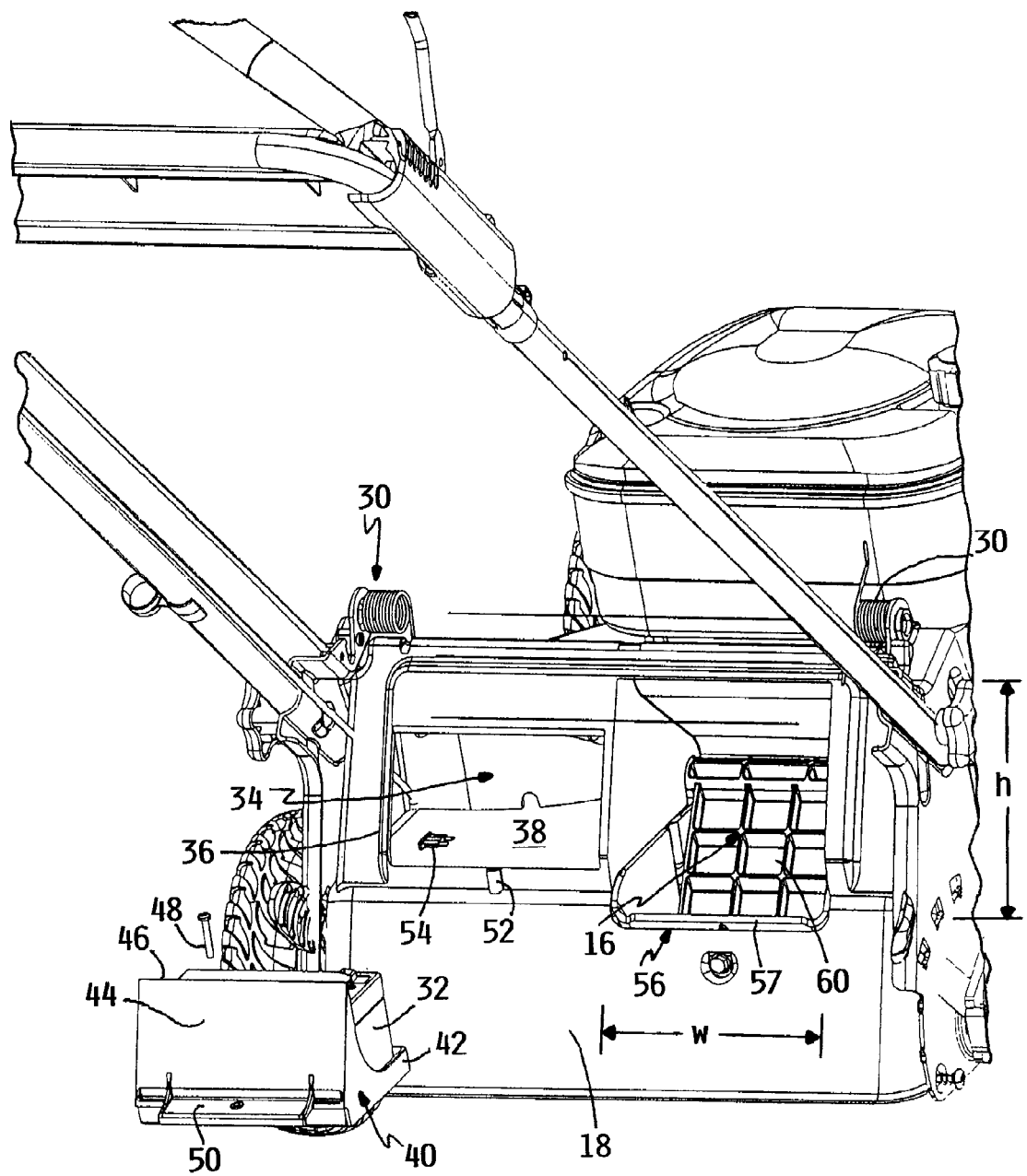
FIG. 6 is an enlarged perspective view of the rear of the mower as shown in FIG. 5, particularly illustrating a removable battery having been removed from a battery compartment through the rear face of the mower and illustrating the pivotal mulch door in its installed position within the mower with the mulch door being closed in the exit tunnel to place the mower into the mulching mode of operation.

Regardless of the use of battery 32 on a particular mower, a battery compartment 34 is provided that is substantially enclosed within the body of mower 2. As best shown in FIG. 6, battery compartment 34 is accessed through an access opening 36 provided in rear face 18 of mower 2. Battery compartment 34 includes a substantially horizontal floor 38 which receives a slidable tray or cradle 40. Battery 32 is dropped down into cradle 40 and is retained in cradle 40 by a short, upwardly projecting lip 42 extending around the front and sides of cradle 40.

The rear of cradle 40 includes an upwardly extending rear wall 44 that extends above battery 32 such that the upper edge 46 of the rear wall is exposed. This edge 46 forms a grip for allowing the user to slide cradle 40 into or out of battery compartment 34. When cradle 40 has been inserted into the compartment, cradle 40 is secured in place by a bolt 48 that passes through a rear flange 50 of cradle 40 and is tightened down into a threaded boss 52 formed on a ledge of rear face 18 immediately below the access opening to battery compartment 34. Suitable electrical connectors 54 are provided in battery compartment 34 for connecting battery 32 to whatever system on mower 2 uses the electrical power stored in battery 32.

This structure provides an easy method for servicing or replacing battery 32 if need be. The user can raise battery 32 cover, unscrew bolt 48, grab the grip provided by upper edge 46 of the rear wall of cradle 40, and then simply slide cradle 40 and battery 32 out of mower 2 through rear face 18 of mower 2. The electrical connectors 54 can be disconnected either prior to or after cradle 40 is slid out. This slide in and slide out cradle 40 eases the task of battery maintenance and is user friendly. In addition, battery 32 is conveniently hidden within the body of mower 2 during use, but is easily removable from mower 2 without having to disassemble any parts of mower 2. All the user has to do is pivot cover 20 upwardly, unscrew cradle 40, and pull battery 32 out by sliding cradle 40 out. No substantial numbers of additional parts are required since cover 20 is needed in any event for abutting against rear face 18 of mower 2 to close off exit tunnel 16 when grass collector 14 is not attached to mower 2.

Referring further to FIG. 6, the rear discharge opening 56 of exit tunnel 16 is depicted to the right of access opening 36 to battery compartment 34. Rear discharge opening 56 is located in rear face 18 of mower 2. In FIG. 6, the viewer is looking into exit tunnel 16 through rear discharge opening 56 towards the front inlet opening 58 of exit tunnel 16. However, front inlet opening 58 of exit tunnel 16 is blocked in FIG. 6 by a pivotal mulch door 60, which is shown in the closed position thereof.

As is also seen in FIG. 6, rear discharge opening 56 of exit tunnel 16 has a height h and a width w that define an open area. This open area is approximately 25 to 35% of the area of rear face 18 of mower 2. Moreover, rear discharge opening 56 of exit tunnel 16 occupies one of the upper quarters of rear face 18 of mower 2. The lower edge 57 of rear discharge opening 56 is also approximately half way up the height of rear face 18 of mower 2. The significance of this positioning will be described in more detail hereafter.

Figure 7:
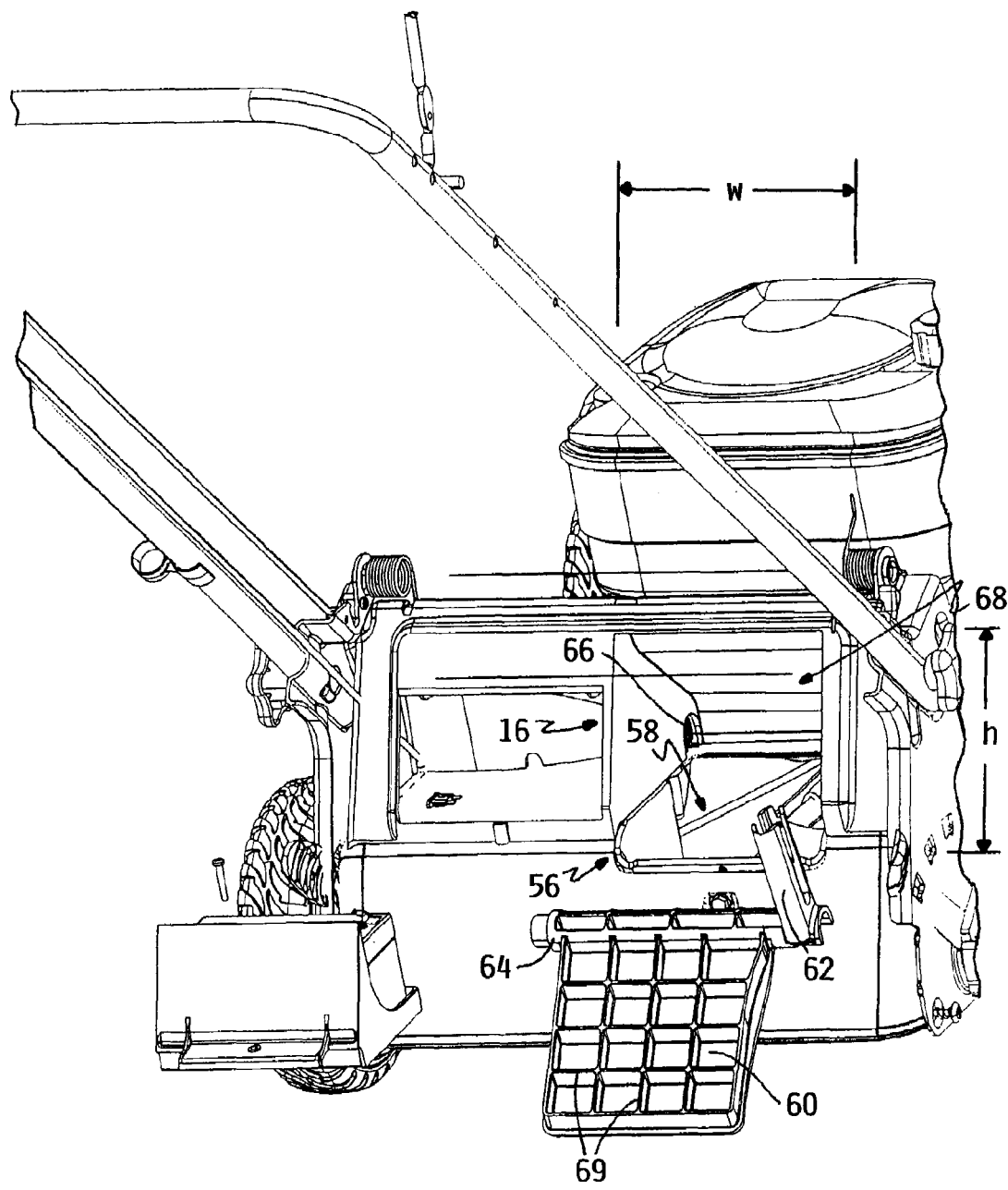
FIG. 7 is a perspective view similar to FIG. 6, but showing the pivotal mulch door also having been removed from the mower and positioned behind the mower.

In FIG. 7, mulch door 60 has been removed from the interior of mower 2 and pulled out. Now, the viewer can look all the way through exit tunnel 16 and down into the interior of the cutting chamber. Mulch door 60 and a lower portion of an operating handle 62 for mulch door 60 are molded together out of plastic as a single piece. Mulch door 60 has a cylindrical hub 64 formed therewith. The ends of cylindrical hub 64 pivotally journal mulch door 60 in circular openings 66 in walls in a shroud 68 that is part of the body of mower 2. As shown in FIG. 7, the rear of mulch door 60 has a plurality of strengthening ribs 69. The front of mulch door 60, hidden in FIG. 7 but visible in FIG. 8, is smooth.

Figure 8:
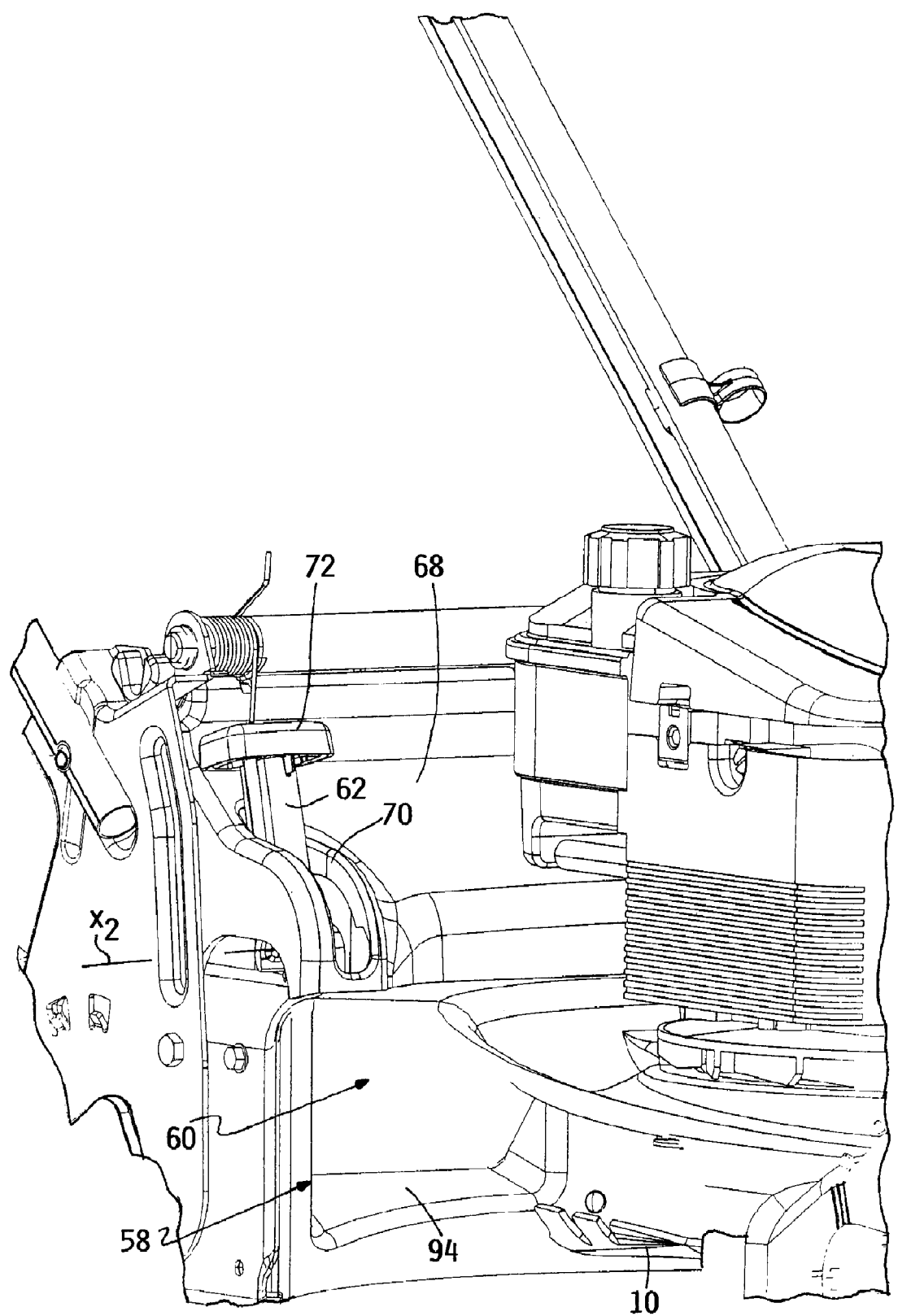
FIG. 8 is a perspective view of a portion of the mower of FIG. 1 with a portion of the sidewall of the cutting chamber having been removed, particularly illustrating the handle of the mulch door in a rear position corresponding to the closed position of the mulch door in the mulching mode of operation.

Referring now to FIGS. 8-12, the aforementioned shroud 68 in which mulch door 60 is pivoted is seen in FIG. 8 from the front. Shroud 68 has an elongated fore and aft slot 70 through which handle 62 extends when mulch door 60 is in place in exit tunnel 16. The lower portion of handle 62 has an enlarged knob 72 secured to the top thereof. FIG. 8 depicts handle 62 in a raised rear position thereof corresponding to the closed position of mulch door 60. Note that mulch door 60 can be seen in FIG. 8 having been swung down into engagement with the bottom of exit tunnel 16 to close or block off front inlet opening 58 to exit tunnel 16 substantially immediately behind front inlet opening 58. In achieving this pivoting motion, mulch door 60 pivots about the substantially horizontal pivot axis defined by the axis of hub 64. This pivot axis is labeled x2 in FIG. 8.

Figure 9:
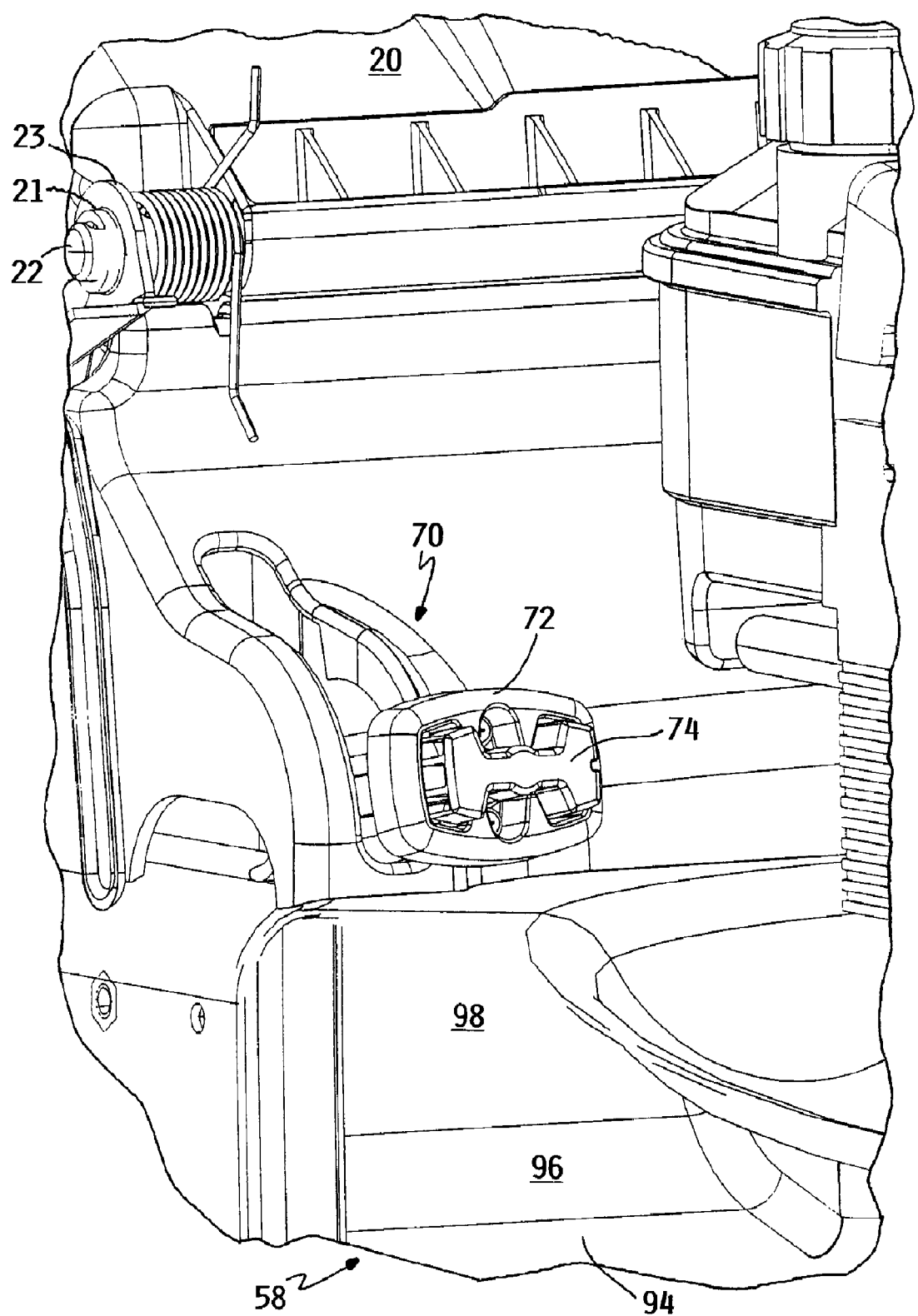
FIG. 9 is a perspective view similar to FIG. 8, but showing the handle in a front position corresponding to an open position of the mulch door in the collecting mode of operation.

Referring now to FIG. 9, to open exit tunnel 16, namely to pivot mulch door 60 upwardly towards the top of exit tunnel 16, the user must grab knob 72 of handle 62 and must push handle 62 downwardly from the upper rear end of slot 70 into engagement with the lower front end of slot 70. When this occurs, mulch door 60 is swung up inside exit tunnel 16 until it folds up generally adjacent the top wall of exit tunnel 16. Note mulch door 60 is no longer visible in FIG. 9 since it has moved up out of view in this lowered position of handle 62. In this position of handle 62, mower 2 is in the collecting mode and the grass clippings can exit the cutting chamber and move into grass collector 14 by passing through the now open exit tunnel 16.

Preferably, a retainer is provided for locking or holding mulch door 60 in its open or closed positions. One embodiment of such a retainer is illustrated herein. That embodiment includes a depressible push button 74 carried on top of handle 62 within the enlarged knob. As shown in FIG. 9, the push button has a dog bone or barbell shape received inside a similarly shaped cavity in knob 72. The user can push down on push button 74 in the direction of the arrow C in FIG. 10 with the user's thumb or palm as the user grips knob 72 with his or her hand.

Figure 10:
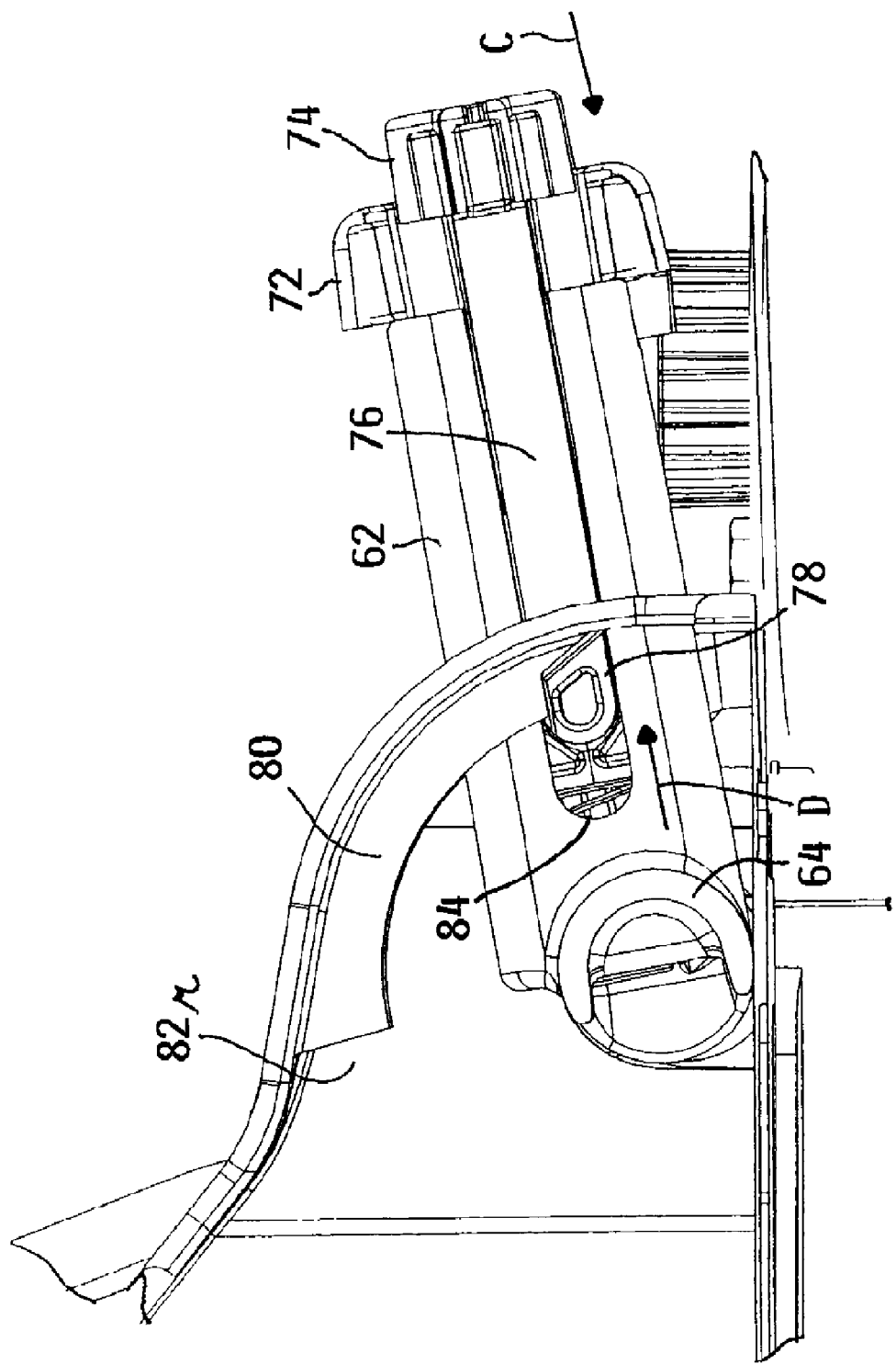
FIG. 10 is a partial cross-sectional view of the handle of the mulch door as shown in FIG. 9, particularly illustrating the push button of the handle and its engagement with a front detent for holding the handle in the front position.
Figure 12:
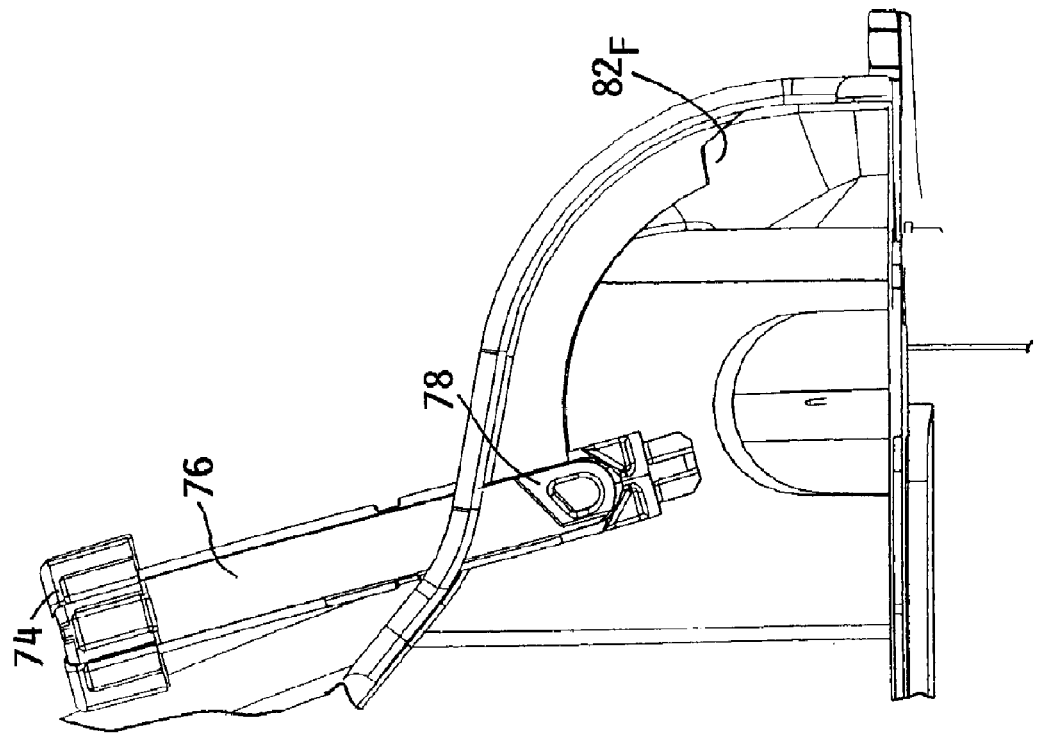
FIG. 12 is a partial cross-sectional view similar to FIG. 10, particularly illustrating only the push button of the handle and its engagement with the rear detent for holding the handle in its rear position.
Figure 11:
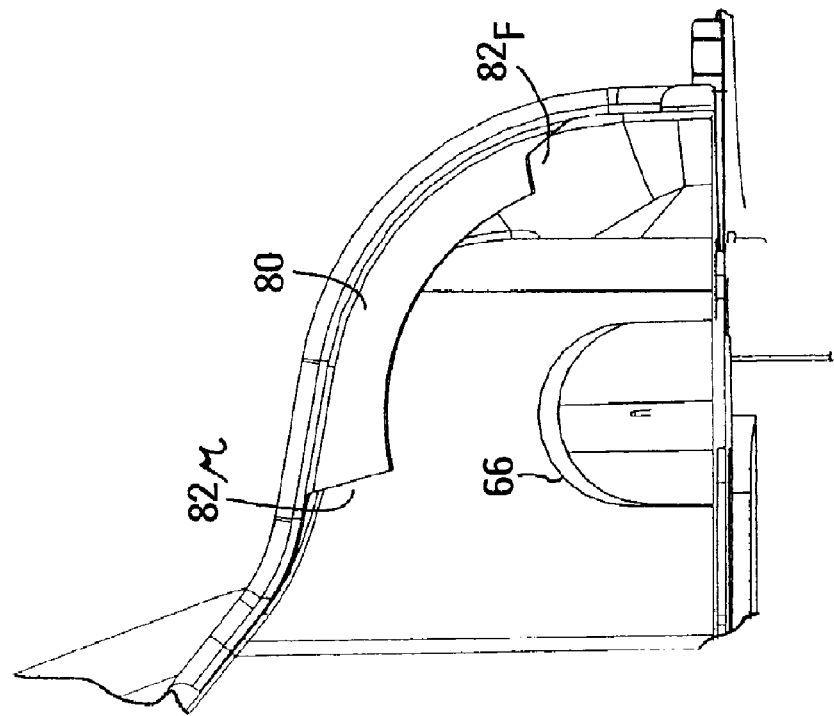
FIG. 11 is a partial cross-sectional view similar to FIG. 10, but with the handle having been removed to show the curved rail forming the front and rear detents for holding the handle in the front and rear positions thereof, respectively.

Referring further to FIG. 10, push button 74 has an extended slide 76 that passes down through the lower portion of handle 62. Each side of slide 76 includes a locking tab 78 formed thereon with only one such locking tab 78 being visible in FIG. 10 as locking tab 78 on the other side of slide 76 is hidden. Each side of slot 70 has a curved rail 80 on an underside of shroud 68 adjacent slot 70 with the ends of curved rail 80 forming both an upper rear detent 82r and a lower front detent 82f. See FIG. 11 for an illustration of front and rear detents 82.

A compression spring 84 is provided beneath slide 76 of push button 74. Spring 84 extends between the bottom of slide 76 and the top of hub 64 of mulch door 60. Spring 84 can be partially seen in FIG. 10. Spring 84 biases push button 74 upwardly relative to handle 62 in the direction of the arrow D in FIG. 10. Thus, the top of push button 74 has a normal position in which it is extended a small distance above the surface of knob 72 of handle 62, as best shown in FIGS. 9 and 10.

In FIG. 10, handle 62 is shown locked in its lower front position. Locking tabs 78 on slide 76 of push button 74 are located in the lower front detents 82f on either side of slot 70. To release handle 62 for movement, the user simply grips handle 62 and pushes down on push button 74 with his or her thumb or palm to depress locking tabs 78 against the bias of spring 84 until locking tabs 78 have cleared the front detents 82f. The operator then simply pivots handle 62 up the length of slot 70 until handle 62 engages against the upper rear end of slot 70. At this point, the operator can release handle 62 and push button 74 simply by removing his or her hand from handle 62. The bias of spring 84 will then cause slide 76 to rise to engage locking tabs 78 with the upper rear detents 82r with spring 84 biasing also causing push button 74 to pop back out of the top of knob 72. See FIG. 12. Thus, mulch door 60 can be moved between its open and closed positions, and can be retained in either of its open and closed positions, by a simple, intuitively operable operating handle 62 that is merely slid from one end of a fore and aft slot 70 to another to select either of the two desired positions and that has a simple release provided by push button 74.

Figure 15:
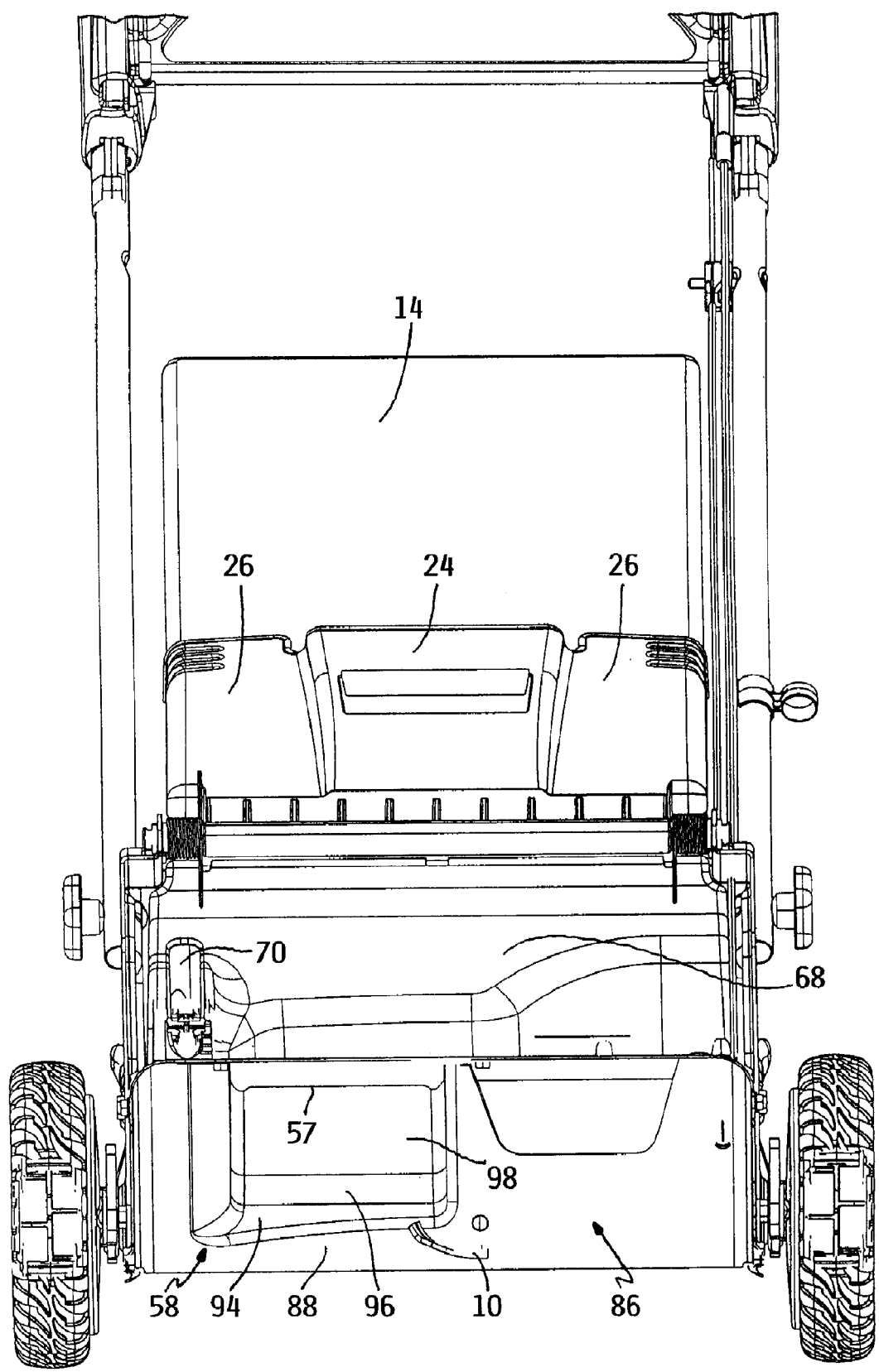
FIG. 15 is a transverse cross-sectional view of the mower as shown in FIG. 1 taken through the rear of the cutting chamber just forward of the front inlet opening of the exit tunnel, particularly illustrating the exit tunnel from the front thereof.
Figure 16:
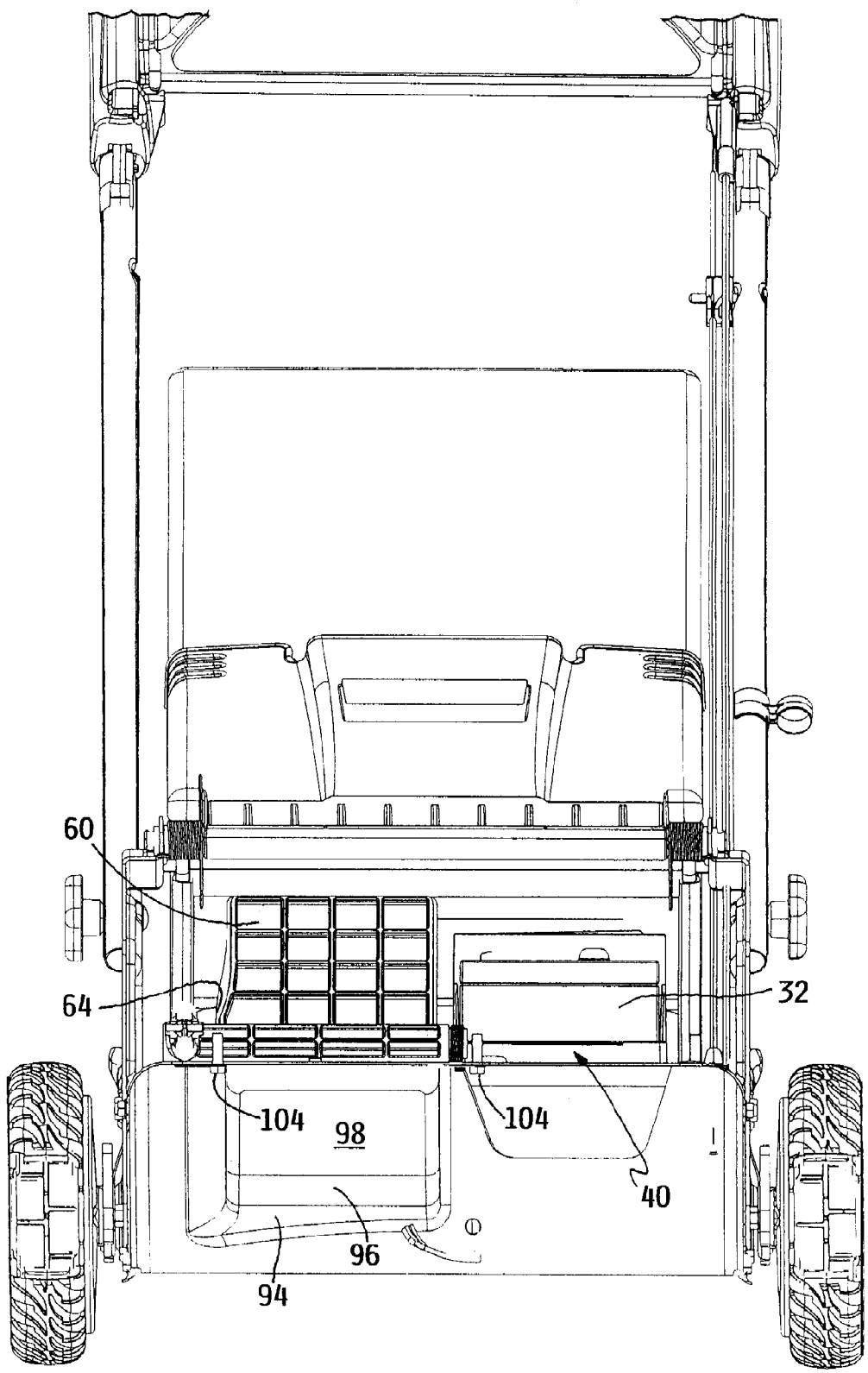
FIG. 16 is a cross-sectional view similar to FIG. 15, but with the shroud that covers the mulch door and battery having been removed to illustrate both the mulch door and the battery from the front thereof.
Figure 17:
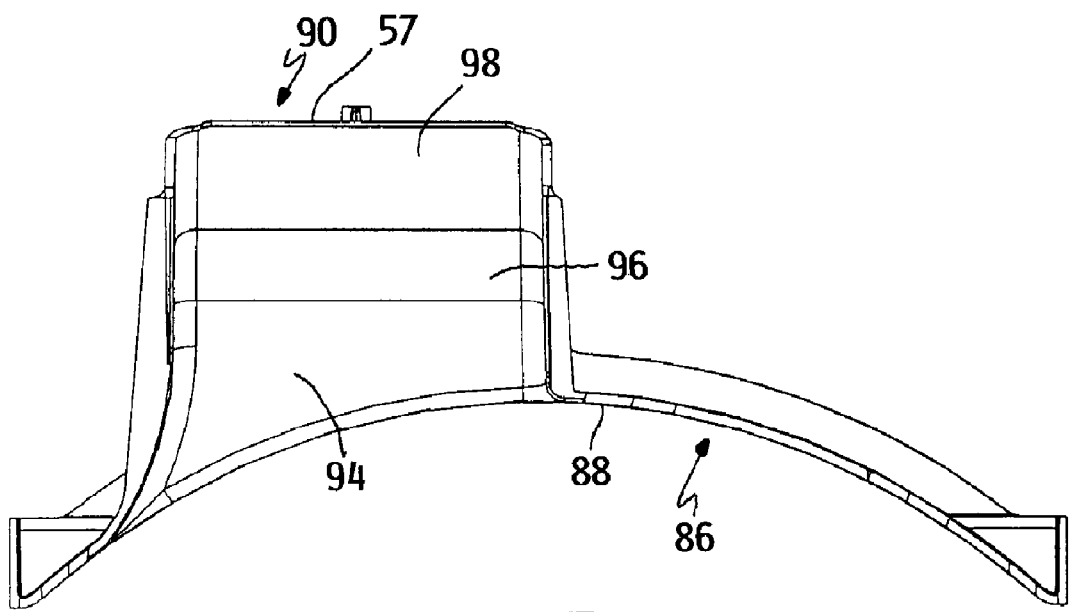
FIG. 17 is a top plan view of the bottom of the exit tunnel and the curved rear scroll that forms the rear portion of the sidewall of the cutting chamber.
Figure 18:
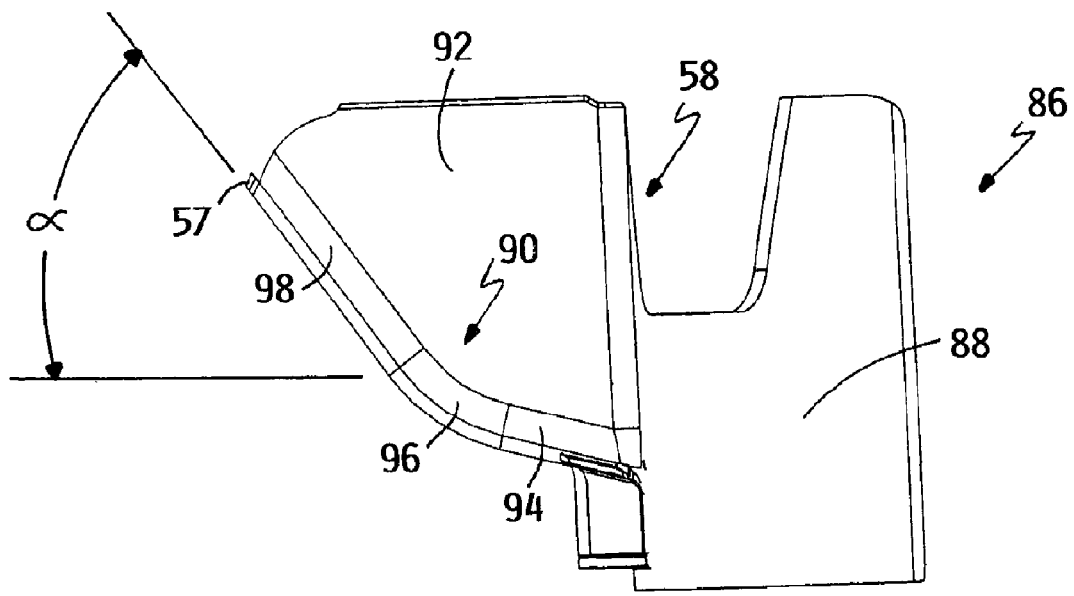
FIG. 18 is a longitudinal cross-sectional view through the exit tunnel and sidewall portion depicted in FIG. 17, particularly illustrating the steeply inclined rear ramp of the exit tunnel.

Referring now to FIGS. 15-18, the rear portion of the cutting chamber is formed by an arcuate scroll 86 having a vertical face 88. Scroll 86 is individually depicted in FIG. 17. Scroll 86 is secured within a metal casting that forms much of the rest of deck 4. When in place, the vertical face 88 of scroll 86 forms a continuation of that portion of the circumferential, peripheral sidewall 12 of the annular cutting chamber provided in the metal casting. Thus, as shown in FIG. 15, the tip of cutting blade 10 sweeps past this sidewall 12, i.e. sweeps past the vertical face 88 of scroll 86, as it rotates around within the cutting chamber. A bottom half of exit tunnel 16 is formed as part of scroll 86 as shown in FIGS. 17 and 18. The top half of exit tunnel 16 is formed as part of shroud 68.

The bottom half of exit tunnel 16 formed in scroll 86 has an upwardly facing U-shaped defined by a bottom wall 90 of exit tunnel 16 and by lower sections 92 of spaced side walls of exit tunnel 16. Bottom wall 90 of exit tunnel 16 includes three separate sections, namely an entrance section 94 at the beginning of exit tunnel 16 immediately in back of front inlet opening 58, a curved or arcuate middle transition section 96, and a rather steeply inclined rear ramp section 98. See FIG. 18. Rear ramp section 98 is steeply angled upwardly relative to horizontal, as indicated by the angle α FIG. 18, in the range of 45° to 60° and preferably approximately 52° to 57°, with the end of rear ramp section 98 comprising the lower edge 57 of rear discharge opening 56 of exit tunnel 16. In addition, the total rise on bottom wall 90 of exit tunnel 16 from the lower edge 59 of front inlet opening 58 to the lower edge 57 of rear discharge opening 56 is approximately equal to the length of exit tunnel 16. This configuration effectively locates rear discharge opening 56 of exit tunnel 16 quite high on rear face 18 of mower 2 as seen in FIG. 6.

The high location of rear discharge opening 56 of exit tunnel 16 in conjunction with the steeply inclined rear ramp section 98 of bottom wall 90 of exit tunnel 16 directs the grass clippings from exit tunnel 16 into the front of grass collector 14 in a direction against the front of the top wall of grass collector 14. This is shown by the arrows E in FIG. 14. This optimizes the performance of mower 2 in its collecting mode. Grass clippings are deposited into grass collector 14 in a manner that most efficiently loads the grass clippings into grass collector 14 without such clippings dribbling back out of exit tunnel 16.

Figure 14:
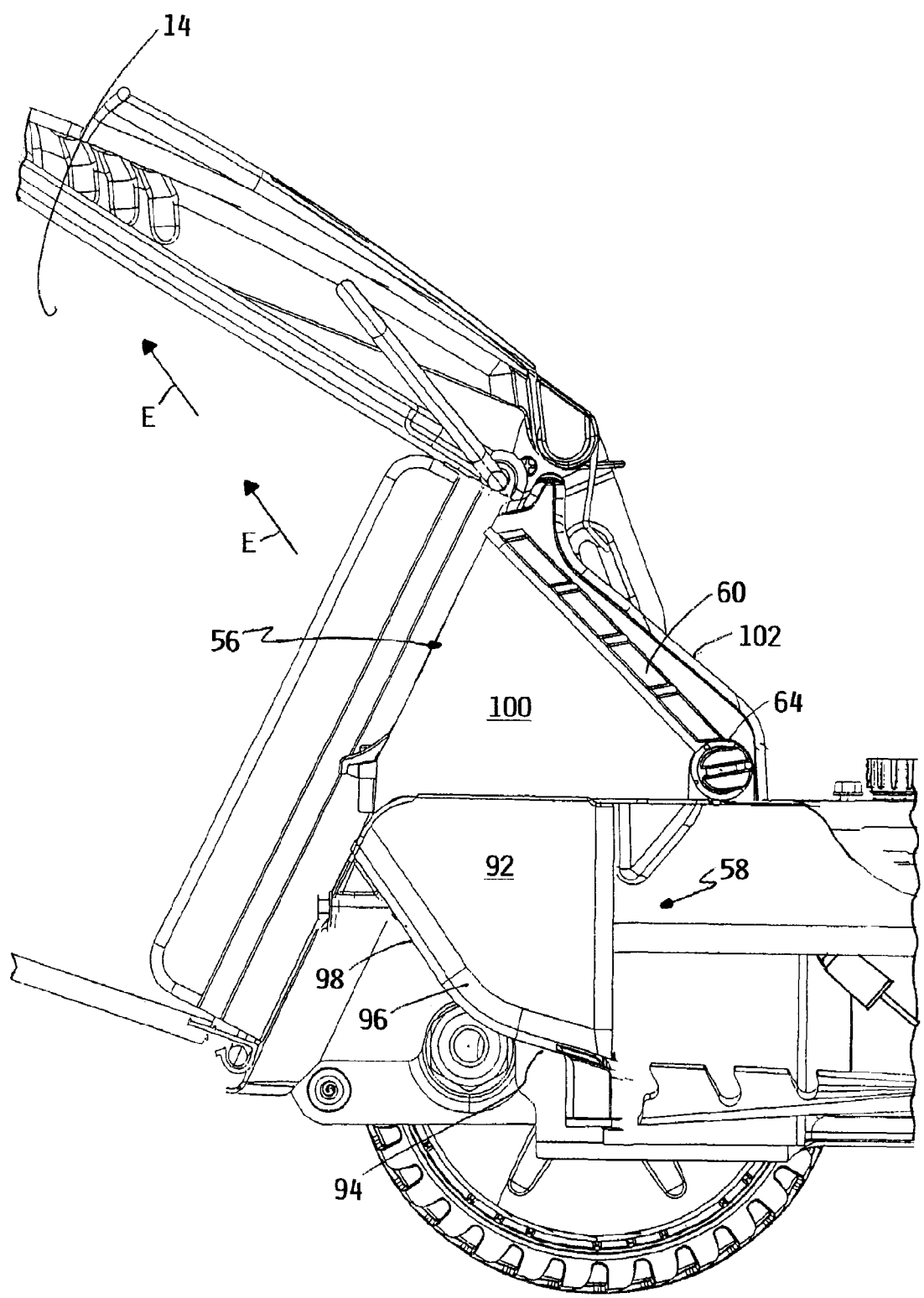
FIG. 14 is a cross-sectional view similar to FIG. 13, but now showing a grass collector having been attached to the rear of the mower and with the mulch door in an open position in the exit tunnel to place the mower into its collecting mode of operation.

The entire exit tunnel 16 is shown in longitudinal cross-section in FIGS. 13-15. This includes the bottom half of exit tunnel 16 formed by scroll 86 shown in FIGS. 18 and 19. The remainder of exit tunnel 16, namely the top half of exit tunnel 16 comprising the upper sections 100 of the side walls and the top wall 102 of exit tunnel 16, is formed in shroud 68 that forms part of the body of mower 2. Together, these two pieces, namely scroll 86 and shroud 68, form the complete exit tunnel 16. In addition, shroud 68 serves to pivotally journal mulch door 60 in openings 66 and includes slot 70 in which handle 62 of mulch door 60 moves. Shroud 68 is simply bolted to the top wall of the metal deck casting by a plurality of bolts 104 shown in FIG. 16.

Referring now specifically to FIG. 13, mulch door 60 is shown in its closed position. In this position, mulch door 60 inclines downwardly and slightly rearwardly from its pivot axis at the front of exit tunnel 16 where top wall 102 of exit tunnel 16 begins to rise in height relative to the top of deck 4. The free rear end of mulch door 60 engages bottom wall 90 of exit tunnel 16 generally along the line or junction between entrance section 94 and middle transition section 96. As shown in FIG. 13, this blocks exit tunnel 16 to the passage of grass clippings through exit tunnel 16 and places mower 2 into its mulching mode of operation.

If mulch door 60 is pivoted into its open position without grass collector 14 being attached to the rear of mower 2, cover 20 will remain closed due to the bias of torsion springs 30. Thus, the user and bystanders are still protected against the passage of thrown objects or the like due to the presence of cover 20 even though the user might inadvertently leave mulch door 60 in the open position. However, cover 20 stands off from rear face 18 of mower 2 as shown by the gap g in FIG. 13.

Thus, if the user operates mower 2 with grass collector 14 removed and mulch door 60 inadvertently left open, the grass clippings can pass through the gap g. These grass clippings will be directed downwardly towards the ground by cover 20 and will be deposited on the ground in back of mower 2. This serves to alert the user that mulch door 60 is still open. The user can then pivot mulch door 60 to its closed position to seal off exit tunnel 16 to the passage of any grass clippings.

FIG. 14 shows the orientation of mulch door 60 when mulch door 60 is open and grass collector 14 is attached, i.e. mower 2 is in the collecting mode. In this position, mulch door 60 has been folded up against top wall 102 of exit tunnel 16. Mulch door 60 is only slightly less inclined than the steeply inclined rear ramp section 98 of bottom wall 90 of exit tunnel 16, i.e. mulch door 60 in its open position is approximately parallel to rear ramp section 98. As shown in FIG. 14 by the arrows E, the stream of grass clippings will be thrown in a direction that causes the stream to impact against the top wall of grass collector 14 in the front half of grass collector 14. Again, as noted earlier, the Applicants have found that this orientation and the size and placement of rear discharge opening 56 relative to the open mouth of grass collector 14, namely rear discharge opening 56 is about 25 to 35% of the area of the open mouth of grass collector 14 and is positioned in an upper quarter of grass collector 14, to be effective in causing even and full filling of grass collector 14. Thus, performance as a grass collecting lawn mower has been optimized.

Yet, in the mulching mode, performance is also very good. Mulch door 60 hangs down and pivots from a front end of exit tunnel 16 to seal off exit tunnel 16 substantially at or slightly behind front inlet opening 58 to exit tunnel 16. Essentially, when mulch door 60 is in place, there is little disruption in the normal annular shape of the cutting chamber. This aids in mulching since exit tunnel 16 will not fill or pack with grass clippings since exit tunnel 16 is closed off at front inlet opening 58 rather than rear discharge opening 56.

Various modifications of this invention will be apparent to those skilled in the art. For example, the slide in-slide out mounting of battery 32 in an access opening 34 in rear face 18 of mower 2, which opening 34 is normally closed off by cover 20, could be used in mowers other than those incorporating exit tunnel 16 and mulch door 60.

In addition, mower 2 could be provided with other than the above described collecting and mulching modes of operation. For example, sidewall 12 of the cutting chamber could be provided with a selectively openable side discharge opening (not shown) for discharging grass clippings to one side of mower 2. In addition, instead of using grass collector 14, a rear discharge chute could be mated with rear discharge opening 56 for discharging grass clippings to the rear of mower 2. Thus, the scope of the invention shall be limited only by the appended claims.

We claim:

1. A lawn mower having at least a collecting mode of operation, which comprises:
    (a) a cutting deck having a downwardly facing cutting chamber;
    (b) a handle assembly extending upwardly and rearwardly from the cutting deck to allow a user who walks behind the cutting deck to guide and operate the cutting deck;
    (c) a rotatable cutting blade within the cutting chamber for cutting grass, wherein the cutting blade rotates about a substantially vertical axis of rotation within a substantially horizontal cutting plane;
    (d) an exit tunnel located on the deck, wherein the exit tunnel extends rearwardly from a front inlet opening to a rear discharge opening located on a rear face of the deck;
    (e) a grass collector for receiving and retaining grass clippings therein, the grass collector having an open mouth substantially overlying the rear face of the deck and completely overlying the rear discharge opening of the exit tunnel, wherein the grass collector extends rearwardly from the cutting deck; and
    (f) wherein the exit tunnel has a bottom wall that includes a rear ramp section having a rear edge that forms a lower edge of the rear discharge opening, wherein the rear ramp section is inclined approximately at least 45° upwardly relative to the horizontal for projecting the grass clippings upwardly into an upper portion of the grass collector.

2. The lawn mower of claim 1, wherein the rear discharge opening has an open area that covers approximately at least 25% of that portion of the rear face covered by the open mouth of the grass collector.

3. The lawn mower of claim 1, wherein the rear face has an upper left quarter, an upper right quarter, a lower left quarter and a lower right quarter from a perspective of an observer standing behind the rear face and looking forwardly, wherein the open mouth of the grass collector substantially covers all four quarters of the rear face, and wherein the rear discharge opening has an open area that covers approximately one of the upper quarters of the rear face.

4. The lawn mower of claim 3, wherein the upper quarter covered by the open area of the rear discharge opening is on that side of the rear face that the blade rotates towards given a predetermined direction of blade rotation.

5. The lawn mower of claim 4, wherein the blade rotates in a clockwise direction from a perspective of an observer standing behind the rear face and looking forwardly and downwardly, and wherein the upper quarter covered by the open area of the rear discharge opening is the upper right quarter of the rear face.

6. The lawn mower of claim 1, wherein the lawn mower also has a mulching mode of operation, and further including a pivotal mulch door in the exit tunnel that pivots between a closed position to block the flow of grass clippings through the exit tunnel in the mulching mode of operation and an open position to permit the flow of grass clippings through the exit tunnel and into the grass collector in the collecting mode of operation.

7. The lawn mower of claim 6, wherein the mulch door pivots about a substantially horizontal pivot axis at an upper edge of the front inlet opening to the exit tunnel.

8. A lawn mower having at least a collecting mode of operation, which comprises:

(a) a cutting deck having a downwardly facing cutting chamber;
(b) a handle assembly extending upwardly and rearwardly from the cutting deck to allow a user who walks behind the cutting deck to guide and operate the cutting deck;
(c) a rotatable cutting blade within the cutting chamber for cutting grass, wherein the cutting blade rotates about a substantially vertical axis of rotation within a substantially horizontal cutting plane;
(d) an exit tunnel located on the deck, wherein the exit tunnel extends rearwardly from a front inlet opening to a rear discharge opening located on a rear face of the deck, wherein the rear face has an upper left quarter, an upper right quarter, a lower left quarter and a lower right quarter from a perspective of an observer standing behind the rear face and looking forwardly;
(e) a grass collector for receiving and retaining grass clippings therein, the grass collector having an open mouth that substantially covers all four quarters of the rear face, wherein the grass collector extends rearwardly from the cutting deck;
(f) wherein the rear discharge opening has an open area that covers approximately one of the upper quarters of the rear face;
(g) a pivotal rear cover pivotally attached adjacent an upper edge of the rear face, wherein the rear cover is spring biased to abut against a portion of the rear face when the grass collector is removed to overlie the rear discharge opening of the exit tunnel when the grass collector is removed; and
(h) a battery compartment in an interior of the cutting deck with the battery compartment being reached by an access opening thereto provided in the rear face, wherein the access opening to the battery compartment is made accessible when the rear cover is pivoted upwardly by a user relative to the rear face.

9. The lawn mower of claim 8, wherein the upper quarter covered by the open area of the rear discharge opening is on that side of the rear face that the blade rotates towards given a predetermined direction of blade rotation.

10. The lawn mower of claim 8, wherein the access opening to the battery compartment is located in the other upper quarter of the rear face.

11. A lawn mower having both a collecting mode of operation and a mulching mode of operation, which comprises:
(a) a cutting deck having a downwardly facing cutting chamber;
(b) a handle assembly extending upwardly and rearwardly from the cutting deck to allow a user who walks behind the cutting deck to guide and operate the cutting deck;
(c) a rotatable cutting blade within the cutting chamber for cutting grass, wherein the cutting blade rotates about a substantially vertical axis of rotation within a substantially horizontal cutting plane;
(d) an exit tunnel located on the deck, wherein the exit tunnel extends rearwardly from a front inlet opening to a rear discharge opening located on a rear face of the deck;
(e) a grass collector for receiving and retaining grass clippings therein, the grass collector having an open mouth that substantially covers the rear face, wherein the grass collector extends rearwardly from the cutting deck;
(f) wherein the rear discharge opening has an open area provided in the rear face of the deck;
(g) a pivotal mulch door in the exit tunnel that pivots between a closed position to block the flow of grass clippings through the exit tunnel in the mulching mode of operation and an open position to permit the flow of grass clippings through the exit tunnel and into the grass collector in the collecting mode of operation; and
(h) a pivotal rear cover pivotally attached adjacent an upper edge of the rear face, wherein the rear cover is spring biased to a closed position relative to the exit tunnel to abut against a portion of the rear face when the grass collector is removed to overlie the rear discharge opening of the exit tunnel when the grass collector is removed, and wherein the rear cover in the closed position thereof has a vertically extending, channel shaped portion that overlies but stands off from a portion of the rear discharge opening such that grass clippings can flow through the exit tunnel if the mulch door is in the open position thereof and pass out of the exit tunnel against the rear cover with the grass clippings being received in the channel shaped portion of the rear cover, and wherein the channel shaped portion of the rear cover also stands off from the rear face of the deck and provides a downwardly facing gap between the rear face of the deck and a bottom of the channel shaped portion of the cover to deflect such exiting grass clippings downwardly through the gap onto the ground behind the cutting deck to alert the operator to the fact that the mulch door is in the open position.

* * * * *